United States Patent [19]

Rehmer et al.

[11] Patent Number: 5,208,282

[45] Date of Patent: May 4, 1993

[54] AQUEOUS SYNTHETIC RESIN FORMULATIONS

[75] Inventors: Gerd Rehmer, Beindersheim; Maria G. Rau, Bad Durkheim; Eckehardt Wistuba, Bad Durkheim; Reinhard Baecher, Bad Durkheim; Helmut Teichmann, Bad Durkheim; Wilhelm F. Beckerle, Bobenheim-Roxheim, all of Fed. Rep. of Germany

[73] Assignee: BASF Aktiengesellschaft, Ludwigshafen, Fed. Rep. of Germany

[21] Appl. No.: 698,858

[22] Filed: May 13, 1991

[30] Foreign Application Priority Data

May 18, 1990 [DE] Fed. Rep. of Germany ....... 4016056

[51] Int. Cl.$^5$ ................................................ C08K 5/23
[52] U.S. Cl. .................................... 524/190; 524/369; 524/375
[58] Field of Search ............................... 524/190, 715

[56] References Cited

U.S. PATENT DOCUMENTS

| | | | |
|---|---|---|---|
| 4,246,154 | 1/1981 | Yao | 524/190 X |
| 4,267,091 | 5/1981 | Geelhaar et al. | 526/315 X |
| 4,435,489 | 3/1984 | Müller et al. | 524/715 X |
| 4,927,891 | 5/1990 | Kamath et al. | 524/548 X |

FOREIGN PATENT DOCUMENTS 1193412 6/1970 United Kingdom .

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

Aqueous synthetic resin formulations containing

A) from 3 to 75% by weight of one or more synthetic resins,
B) one or more organic compounds having two or more hydrazide groups,
C) from 0 to 10% by weight, based on the synthetic resin A, of benzophenone or acetophenone or of one or more acetophenone or benzophenone derivatives which are not monoethylenically unsaturated or of a mixture of these active ingredients,
D) effective amounts of emulsifiers or protective colloids or of a mixture of these active ingredients,
E) not less than 5% by weight of water and
F) from 0 to 85% by weight of finely divided fillers, with the proviso that the total amount of the monomers d polymerized in the one or more synthetic resins A and of component C is from 0.05 to 10% by weight, based on the one or more synthetic resins A, and the ratio of the number of moles of hydrazide groups of component B and the number of moles of the aldehyde and keto groups of the monomers c polymerized in the one or more synthetic resins A is from 0.01 to 2.

These synthetic resin formulations are suitable for coating, adhesive bonding, sealing or impregnating.

8 Claims, No Drawings

AQUEOUS SYNTHETIC RESIN FORMULATIONS

The present invention relates to aqueous synthetic resin formulations essentially containing
A) from 3 to 75% by weight of one or more synthetic resins which consist of
   a) from 50 to 99.85% by weight of one or more esters of α, β-monoethylenically unsaturated carboxylic acids of 3 to 6 carbon atoms and alkanols of 1 to 18 carbon atoms or one or more vinyl esters of an aliphatic monocarboxylic acid of 2 to 8 carbon atoms or of a mixture of these monomers (monomer a),
   b) from 0.1 to 12% by weight of one or more α, β-monoethylenically unsaturated mono- or dibasic acids of 3 to 8 carbon atoms, of anhydrides thereof or of a mixture of these monomers (monomer b),
   c) from 0.05 to 10% by weight of one or more monoethylenically unsaturated monomers of 2 to 24 carbon atoms which are not an acetophenone or benzophenone derivative and have one or more aldehyde or keto groups or a mixture of both groups (monomer c),
   d) from 0 to 10% by weight of one or more monoethylenically unsaturated acetophenone or benzophenone derivatives or a mixture of these monomers (monomer d) and
   from 0 to 35% by weight of one or more other copolymerizable monoethylenically unsaturated monomers (monomer e), in polymerized form,
   the percentages by weight of monomers a, b, c and e being chosen within the stated limits so that a synthetic resin consisting only of these monomers would have a glass transition temperature of from 40° to −50° C.,
B) one or more organic compounds having two or more hydrazide groups,
C) from 0 to 10% by weight, based on the synthetic resin A, of benzophenone or acetophenone or of one or more acetophenone or benzophenone derivatives which are not monoethylenically unsaturated or of a mixture of these active ingredients,
D) effective amounts of emulsifiers or protective colloids or of a mixture of these active ingredients,
E) not less than 5% by weight of water and
F) from 0 to 85% by weight of finely divided fillers, with the proviso that the total amount of the monomers d polymerized in the one or more synthetic resins A and of component C is from 0.05 to 10% by weight, based on the one or more synthetic resins A, and the ratio of the number of moles of hydrazide groups of component B and the number of moles of the aldehyde and keto groups of the monomers c polymerized in the one or more synthetic resins A is from 0.01 to 2. The present invention furthermore relates to the preparation of these aqueous synthetic resin formulations and their use as materials for coating, adhesive bonding, sealing or impregnating.

DE-A-172 063 relates to aqueous synthetic resin dispersions whose synthetic resins contain monoethylenically unsaturated acetophenone and/or benzophenone derivatives as polymerized units, in addition to monomers such as acrylates or methacrylates, styrene, acrylonitrile and vinyl esters, and which are obtained by free radical emulsion polymerization in the presence of nonionic emulsifiers, such as

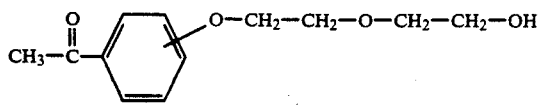

These synthetic resin dispersions are recommended as pigment binders, for film and paper coating and for the preparation of dry-bright emulsions and textile finishes.

However, the resilience of these binders in the solidified state is not entirely satisfactory. A lack of completely satisfactory resilience in the solidified state is a disadvantage, for example, when the compositions are to be used for coating cracked surfaces outdoors, since the outdoor temperature changes produce fluctuations in the crack expansions, which usually leads to breaking of the coating in the course of time if the resilience is not sufficient.

EP-B-5167 relates to binders for coating materials and stonechip renders based on aqueous synthetic resin dispersions of carbonyl-containing copolymers which contain water-soluble aliphatic dihydrazine compounds and heavy metal ions. The disadvantages of these binders are, on the one hand, the necessity of concomitantly using heavy metal ions and, on the other hand, the fact that, particularly in the case of outdoor applications, the surface tack of the resulting coatings and hence their tendency to become soiled are not completely satisfactory.

It is an object of the present invention to overcome the disadvantages described by means of more suitable compositions.

We have found that this object is achieved by the synthetic resin formulations defined at the outset.

Particularly suitable monomers a are the esters of acrylic and methacrylic acid. Of particular importance are the esters of methanol, of ethanol, of the propanols, of the butanols, of the pentanols, of 2-ethylhexanol, of isooctanol, of n-decanol and of n-dodecanol. Particularly suitable vinyl esters are vinyl formate, vinyl acetate, vinyl propionate and vinyl butyrate, among which vinyl propionate is particularly preferred. Preferred monomers b are α, β-monoethylenically unsaturated mono- and dicarboxylic acids, such as acrylic acid, methacrylic acid, ethacrylic acid, itaconic acid, fumaric acid and maleic acid and anhydrides thereof. Other suitable monomers b are the semiamides of dicarboxylic acids, such as maleic, fumaric and itaconic acid. Vinylsulfonic acid, vinylphosphonic acid, acrylamidoglycolic acid and methacrylamidoglycolic acid are further suitable monomers b. The synthetic resins A advantageously contain from >1 to 6% by weight of the monomers b as polymerized units.

Particularly interesting monomers c are acrolein, methacrolein, vinyl alkyl ketones whose alkyl radical is of 1 to 20 carbon atoms, e.g. vinyl methyl ketone, vinyl ethyl ketone and vinyl isobutyl ketone, acryloxy- and methacryloxyalkanals or -alkanones, as described in, for example, German Laid-Open Application DOS 2,722,097, N-oxoalkylacrylamides and -methacrylamides, such as N-3-oxobutylacrylamide and -methacrylamide, N-1,1-dimethyl-3-oxobutylacrylamide and -methacrylamide, N-3-oxo-1,1-dibutyl-2-propylhexylacrylamide, diacetoneacrylamide or diacetonemethacrylamide (the preparation of these monomers is described in, inter alia, DE-A-27 22 097, DE-B-4 266 007, DE-A-20 61 213 and DE-A-22 07 209), and acetonyl acrylate and methacrylate, diacetone acrylate and methacrylate and acrylamidopivaldehyde. Diacetoneacrylamide and diacetonemethacrylamide are preferably used. The synthetic resins A advantageously contain aldo and keto groups polymerized in the form of monomers c in an amount such that the number of moles of said groups per kilogram of synthetic resin A is from 0.025 to 0.25.

Preferred monomers d are monoethylenically unsaturated acetophenone and benzophenone derivatives which have neither a phenyl group possessing a free hydroxyl group ortho to the carbonyl group of the phenone parent structure nor a phenyl group possessing a free amino group ortho or para to the carbonyl group of the phenone parent structure. Among these, compounds of the general formula I

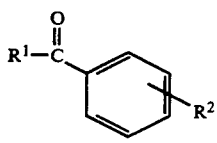

(I)

where $R^1$ is —$CH_3$ or —$C_6H_5$, $R^2$ is

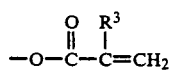

and $R^3$ is —H or —$CH_3$, are particularly suitable. Preferred compounds I are those in which $R^1$ is phenyl and $R^2$ is para to the carbonyl group of the phenone parent structure.

Other suitable monomers d of this type are compounds of the general formula II

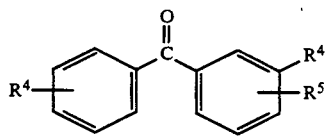

(II)

where $R^4$ is —H or —$C_nH_{2n+1}$, where n is from 1 to 4, $R^5$ is —O—$R^6$ or

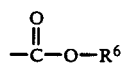

and $R^6$ is

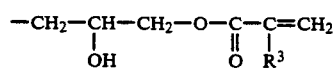

Preferably used compounds II are those in which R is an ester group and is para to the carbonyl group of the phenone parent structure. Other suitable monomers d are compounds of the general formula III

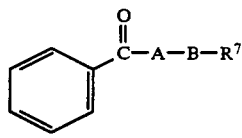

(III)

and compounds of the general formula IV

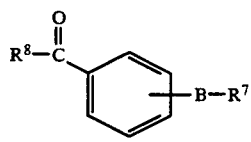

(IV)

where $R^7$ is

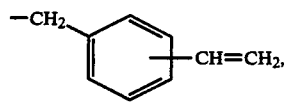

$R^8$ is —$C_nH_{2n+1}$, where n is from 1 to 3, or —$C_6H_5$, A is a saturated or unsaturated hydrocarbon chain of 1 to 3 carbon atoms, which may be branched or a hydrocarbon ring of 3 to 6 carbon atoms, B is —O—,

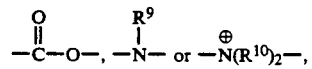

$R^9$ is —H or —$C_nH_{2n+1}$, where n is from 1 to 8, and $R^{10}$ is —$C_nH_{2n+1}$, where n is from 1 to 4.

Other particularly useful monomers d are compounds of the general formula V

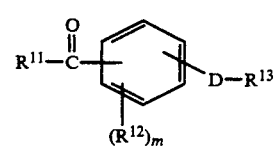

(V)

where $R^{11}$ is lower alkyl or phenyl, and the hydrogen atoms of the phenyl group may be monosubstituted or polysubstituted by halogen, lower alkoxy or hydroxyl, with the proviso that no phenyl hydrogen atom ortho to the carbonyl group of the phenone parent structure is replaced by hydroxyl, $R^{12}$ is halogen, lower alkoxy and/or hydroxyl, with the proviso that, in the case of hydroxyl, $R^{12}$ is not ortho to the carbonyl group of the phenone parent structure, m is from 0 to 4, D is —O—,

an oxyalkyleneoxy chain, a carbamoylalkyleneoxy chain or an alkyleneoxy chain and $R^{13}$ is alkenyl or ω-carboxyalkenyl.

Other particularly advantageously incorporated monomers d are compounds of the general formula VI

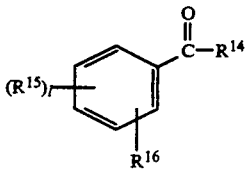

(VI)

where $R^{14}$ is $R^8$ or phenyl, in which up to 1 hydrogen atoms may be replaced by $R^{15}$, 1 is from 0 to 4, $R^{15}$ is —H, —CF₃, —O—alkyl and/or alkyl—COO—, where each alkyl group is of 1 to 4 carbon atoms, halogen, —CN, —COOH or an —OH group which is not ortho to the carbonyl group of the phenone parent structure, $R^{16}$ is a group of the general formula (VII)

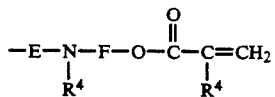  (VII)

where E is

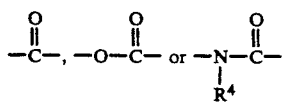

and F is a hydrocarbon chain of 2 to 12 carbon atoms which may be interrupted by one or more oxygen atoms. Preferred compounds VI are the acrylates and methacrylates of the alcohol of the following structure

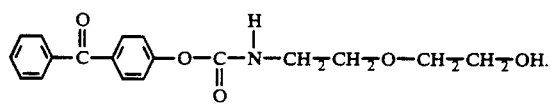

However, very particularly preferred monomers d are compounds of the general formula VIII

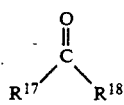  VIII where $R^{17}$ is straight-chain alkyl of 1 to 3 carbon atoms, or alkyl of 3 or 4 carbon atoms, one or more hydrogen atoms of which may be replaced by halogen, or is aryl or $R^{18}$, $R^{18}$ is

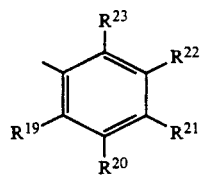

$R^{19}$ to $R^{23}$ independently of one another are each $R^4$, —OH (which must not be ortho to the carbonyl group of the phenone parent structure), —OCH₃, —OC₂H₅, —SH, —SCH₃, —Cl, —F, —CN, —COOH, —COO-alkyl where the alkyl group is of 1 to 3 carbon atoms, —CF₃, —N(CH₃)₂, —N(C₂H₅)₂, —N(CH₃)C₆H₅, —N⊕(CH₃)₃X—, —N⊕(CH₃)₂X⁻, where X⁻ may be an anion, such as Cl⊖, Br⊖CH₃COO⊖, HSO₄⊖, H₂PO₄⊖ or NO₃⁻, with the proviso that one or more of the radicals $R^{19}$ to $R^{23}$ is a radical of the general formula IX where

  (IX)

$R^{24}$ is

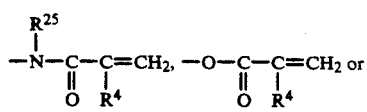

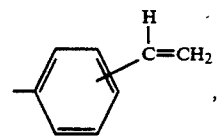

$R^{25}$ is $R^1$ or $R^4$, G is

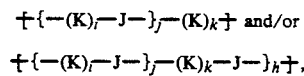 and/or

K is alkylene in which one or more hydrogen atoms may be substituted by halogen, or is cycloalkylene of 5 to 10 carbon atoms or phenylene,
J is —O—, —S—,

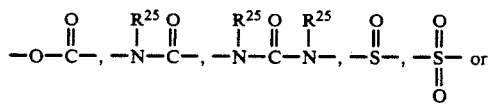 or

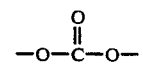

i and k are each from 1 to 10 and j and h are each from 0 to 25, among the compounds VIII, the monomers

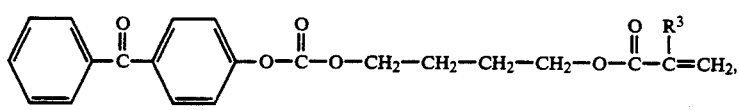

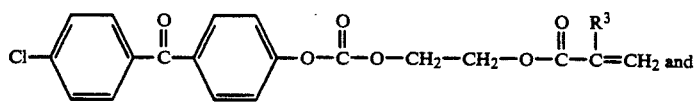

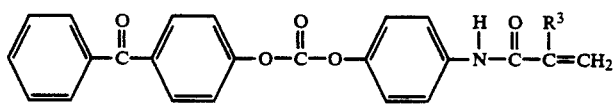

being preferred.

Other suitable monomers d are compounds of the general formula X

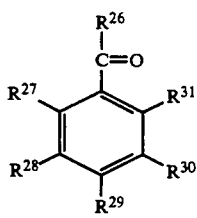

(X)

where $R^{26}$ is alkyl of 1 to 4 carbon atoms, cyclopropyl, cyclopentyl, cyclohexyl, phenyl or a phenyl group in which some or all of the hydrogen atoms are replaced by radicals $R^{29}$ and not more than two substitutents $R^{29}$ are identical, and $R^{26}$ together with $R^{27}$ or together with $R^{21}$ form a —$CH_2$—$CH_2$— or —$CH_2$—$CH_2$—$CH_2$— bridge, $R^{29}$ is alkyl of 1 to 24 carbon atoms,

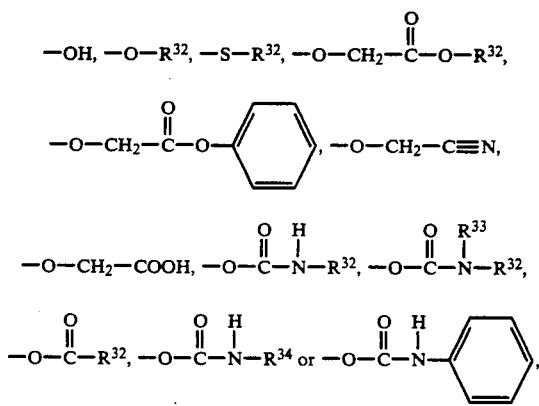

$R^{27}$ or, where $R^{26}$ is aryl, $R^{21}$ is a direct bond to $R^{26}$ ortho to the carbonyl group, or independently of one another are both one Of the radicals $R^{29}$, and $R^{28}$ and $R^{30}$ are each one of the radicals $R^{29}$ or a group of the general formula XI

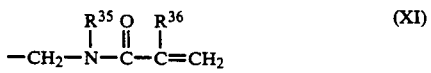

where $R^{32}$ and $R^{33}$ are each alkyl of 1 to 4 carbon atoms, $R^{34}$ is cycloalkyl of 5 or 6 carbon atoms and $R^{35}$ and $R^{36}$ are each hydrogen or alkyl of 1 to 4 carbon atoms, with the proviso that either $R^{28}$ or $R^{30}$ is a group of the general formula XI.

Particularly preferred compounds X are the compounds

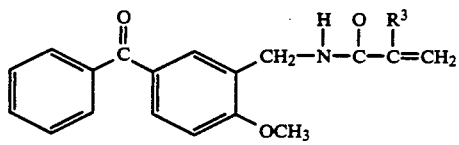

Finally, another suitable monomer d is α, ω-acryloylbutylene-(4,4'-benzoylphenyl) carbonate.

The compounds of the general formulae I to VI and of the general formulae VIII and X are known and are described in, for example, U.S. Pat. No. 3 214 492 (compounds I), U.S. Pat. No. 3 429 852 (compounds II), DE-A-28 18 763 (compounds III and IV), EP-A-246 848 (compounds V) and in the prior publications P 3820463.0 (compounds VI), P 3844444.5 (compounds VIII) and P 4007318.1 (compounds X). The synthetic resins A preferably contain from 0.1 to 2% by weight of monomers d as polymerized units.

Possible monomers e include monoethylenically unsaturated nitrogen compounds which contain no carboxyl, aldo or keto groups, such as acrylamide, methacrylamide, N-vinylformamide, N-vinylpyrrolidone, the amides of acrylic or methacrylic acid and tetrahydrofurfurylamine, acrylonitrile and methacrylonitrile and ureido monomers, such as β-ureidoethyl acrylate, β-ureidoethyl vinyl ether, N-dimethylaminoethyl-N'-vinyl-N,N'-ethyleneurea and N-methacrylamidomethyl-N,N'-ethyleneurea. Half esters of α, β-monoethylenically unsaturated dicarboxylic acids of 4 to 8 carbon atoms and alkanols of 5 to 20 carbon atoms are further suitable monomers e.

Other suitable monomers E are acrylates or methacrylates of diols, e.g. 2-hydroxyethyl acrylate or 1,4-butanediol monoacrylate, and of tetrahydrofurfuryl alcohol, vinylaromatic monomers, such as styrene or vinyltoluene, halogen-containing vinyl monomers, such as vinyl chloride and vinylidene chloride, unsaturated hydrocarbons, such as ethylene, propylene, isobutene, butadiene and isoprene, and lower vinyl ethers. The polyunsaturated monomers e, eg. butadiene, are preferably used in amounts of less than 5% by weight. Preferred monomers e are those, such as tetrahydrofurfur-2-yl methacrylate or tetrahydrofurfur-2-ylacrylamide, which contain ether, ketal, acetal, aminal, hemiaminal or thioacetal groups, ether groups being particularly advantageous. The amount by weight of such monomers in the synthetic resins A should as a rule be less than 20% by weight. Silicon-containing monomers, such as vinyltriethoxysilane, α-methacryloxypropyltrimethoxysilane or vinyltris-2-methoxysilane, are also advantageously polymerized as monomers e in minor amounts, i.e. from 0.01 to 0.5% by weight, based on the synthetic resin A. Further suitable monomers e are compounds, such as 1-(methacryloxyethyl)-imidazolidin-2-one, which improve wet adhesion.

Of particular interest are synthetic resins A whose monomer components a, b, c and e are present in amounts such that a synthetic resin composed only of the monomers a, b, c and e would have a glass transition temperature of −30° to −10° C. According to Fox (T. G. Fox, Bull. Am. Phys. Soc. (Ser. II) 1 (lg56), 123), the following is a good approximation for the glass transition temperature of copolymers:

$$\frac{1}{Tg} = \frac{X^1}{Tg^1} + \frac{X^2}{Tg^2} + \ldots \frac{X^s}{Tg^s}$$

where $X^1, X^2, \ldots, X^S$ are the mass fractions of the monomers 1, 2 ..., s and $Tg^1, Tg^2, \ldots, Tg^s$ are the glass transition temperatures of each of the polymers consisting only of one of the monomers 1, 2, ... or s, in degrees Kelvin. The glass transition temperatures of the monomers a, b and d are essentially known and are listed in, for example, J. Brandrup and E. H. Immergut, Polymer Handbook 1st Ed. J. Wiley, N.Y. 1966 and 2nd Ed. J. Wiley, N.Y. 1975.

The polymers to be used as synthetic resins A are obtainable in principle by the known methods of free radical bulk, solution, suspension and emulsion polymerization. However, since the preferred embodiment of the novel aqueous synthetic resin formulations is the aqueous dispersion, it is advisable also to use the synthetic resin A in this form, and accordingly it is preferably prepared by polymerization of the particular monomers in an aqueous medium under the known conditions of free radical emulsion polymerization in the presence of a water-soluble free radical initiator and an emulsifier D and in the presence or absence of a protective colloid D and a regulator and further assistants.

Emulsifiers D which have proven useful are both nonionic and anionic surfactants. Preferably used nonionic surfactants are ethoxylated alkanols (degree of ethoxylation: from 2 to 100, alkyl radical: $C_8$–$C_{36}$), ethoxylated mono-, di- or trialkylphenols or -naphthols (degree of ethoxylation: from 2 to 100, alkyl radical: $C_4$–$C_{36}$) and ethoxylated aliphatic monocarboxylic acids (degree of ethoxylation: from 6 to 50, alkyl radical: $C_8$–$C_{24}$).

Particularly preferred nonionic emulsifiers are those of the general formula XII

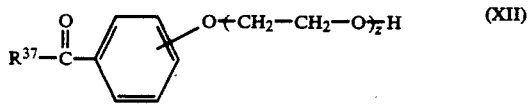

where z is from 1 to 200 and $R^{37}$, is $R^1$ or phenyl which is substituted by straight-chain or branched alkyl of 1 to 18 carbon atoms.

Advantageously used anionic surfactants are the alkali metal salts of the sulfated derivatives of alkanols of 6 to 18 carbon atoms, ethoxylated alkanols (degree of ethoxylation: from 4 to 30, alkyl radical: $C_{12}$–$C_{18}$) and of ethoxylated alkylphenols (degree of ethoxylation: from 4 to 30, alkyl radical: $C_8$–$C_{14}$), the alkali metal and ammonium salts of higher fatty acids and the alkali metal salts of alkylsulfonic acids of 12 to 18 carbon atoms. The alkali metal salts of alkylarylsulfonic acids and of disulfonated alkyldiphenyl oxides (alkyl radical: $C_{10}$–$C_{18}$) are also suitable. Protective colloids D which may be used are, for example, high molecular weight compounds, such as polyvinyl alcohols, polyvinylpyrrolidones, cellulose derivatives, polyacrylamides, polymethacrylamides, polycarboxylic acids or their alkali metal or ammonium salts. The number average molecular weight $\overline{M}_z$ of these protective colloids is preferably from $2.10^4$ to $10^5$.

Particularly suitable polymerization initiators are inorganic peroxides, such as hydrogen peroxide, ammonium peroxodisulfate or alkali metal peroxodisulfates. Azo compounds, such as 2,2′-azobisisobutyronitrile, 2,2′-azobis-(methyl isobutyrate), 2,2′-azobis-(2,4-dimethylvaleronitrile), 2,2′-azobis-(4-methoxy-2,4-dimethylvaleronitrile), 2,2′-azobis-(N,N′-dimethyleneisobutyramidine) dihydrochloride, 2,2′-azobis-(2-amidinopropane) dihydrochloride, 4,4′-azobis-(4-cyanovaleric acid), are also suitable. Organic acyl peroxides, such as dibenzoyl peroxide, dilauroyl peroxide, didecanoyl peroxide and diisononanoyl peroxide, alkyl peresters, such as tert-butyl perpivalate, tert-butyl per-2-ethylhexanoate, tert-butyl permaleate, tert-butyl peracetate and tert-butyl perbenzoate, hydroperoxides, such as tertbutyl hydroperoxide, combined systems which are composed of one or more organic reducing agents and one or more peroxides and/or hydroperoxides, e.g. tert-butyl hydroperoxide oxide and the Na salt of hydroxymethanesulfinic acid, and combined systems which furthermore contain a small amount of a metal compound which is soluble in the polymerization medium and whose metallic component can occur in a plurality of valence states, for example ascorbic acid-/iron(II) sulfate/sodium peroxodisulfate, are also suitable, the Na salt of hydroxymethanesulfonic acid, sodium sulfite, sodium bisulfite or sodium metabisulfite frequently also being used instead of ascorbic acid.

The emulsion polymerization temperature and the amount of polymerization initiators used is chosen in a known manner such that a weight average molecular weight $\overline{M}_w$ of the dispersed synthetic resin A of from $5.10^4$ to $2.10^6$, preferably from $2.10^5$ to $10^6$, is obtained. As a rule, the emulsion polymerization temperature is from 30° to 90° C., preferably from 45° to 85° C., and the polymerization initiators are usually used in amounts of from 0.1 to 10% by weight based on the total amount of monomers. To adjust the molecular weight, molecular weight regulators may additionally be used, usually in amounts of from 0.1 to 5% by weight, based on the total amount of monomers, for example alcohols, such as butenediol or isopropanol, or mercapto compounds, such as mercaptosuccinic acid, or haloform compounds, such as bromoform or chloroform.

The amount of dispersants D, emulsifiers and/or protective colloids used essentially determines the mean diameter of the resulting dispersed synthetic resin particles and the stability of the dispersion. Their amount by weight is usually from 0.05 to 10% by weight, based on the total weight of the monomers.

The emulsion polymerization for the preparation of the synthetic resin A can be carried out both as a batch process and in the form of a feed process, including a stepwise or gradient- procedure. The feed process in which some of the polymerization batch is initially taken and heated to the polymerization temperature and the remainder is then introduced continuously, stepwise or with superposition of a concentration gradient, in separate feeds, one or more of which contain the monomers in pure or emulsified form, is preferred. The solids content of the resulting aqueous starting dispersions containing one or more synthetic resins A in dispersed form with the use of dispersants D is preferably from 30 to 60, particularly preferably from 45 to 55, % by weight.

Particularly suitable components B are compounds which have two hydrazide groups and are derived from organic di- or oligocarboxylic acids, and polyhydrazides which contain more than two hydrazide groups and are derived from polymers containing polymerized acrylates and/or methacrylates (ester group → hydrazide group).

Examples are malonic, succinic, glutaric, adipic, pimelic, suberic, azelaic, sebacic, undecanedioic, dodecanedioic, tridecanedioic, tetradecanedioic, pentadecanedioic, hexadecanedioic and 2-methyltetradecanedioic dihydrazide, methyl-, ethyl-, propyl-, butyl-, hexyl-, heptyl- and octylsuccinic dihydrazide, 2-ethyl-3-propylsuccinic and -glutaric dihydrazide, cyclohexanedicarboxylic and cyclohexylmethylmalonic dihydrazide, terephthalic, phenylsuccinic, cinnamylmalonic and benzylmalonic dihydrazide, pentane-1,3,5-tricarboxylic trihydrazide, 3-cyano-pentane-1,3,5-tricarboxylic trihydrazide, dicyanofumaric dihydrazide and di- or oligohydrazides of dimerized and oligomerized unsaturated fatty acids.

The reaction products of hydrazides with low molecular weight keto compounds, such as acetone, are also suitable masked hydrazides. On film formation, the low molecular weight keto compound generally volatilizes and liberates the hydrazide group. Adipic dihydrazide is preferably used. Novel aqueous synthetic resin formulations in which the ratio of the number of moles of the hydrazide groups of component B and the number of moles of the aldehyde and keto groups of the monomers c which are polymerized in one or more synthetic resins A is from 0.1 to 1 have particularly advantageous performance characteristics.

Component B is generally introduced into the novel aqueous synthetic resin formulations by incorporating it, for example stirring it, in pure form, in solution in a suitable solvent, e.g. water or a lower alcohol, or as an aqueous emulsion, into an aqueous starting dispersion containing one or more synthetic resins A, the dihydrazides of the lower dicarboxylic acids being preferred since they have relatively good water solubility. However, the components B which are less soluble in water are also suitable and are advantageously incorporated in emulsified form.

Acetophenone or benzophenone derivatives which are not monoethylenically unsaturated (component C) and which have proven useful include compounds of the general formula XIII

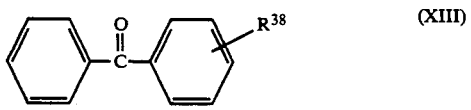

where $R^{38}$ is 4-$CH_3$, 4-OH, 4-$NH_2$, 4-Cl, 4-COOH, 4-$COOCH_3$, 2-COOH, 2-$COOCH_3$, 3-$NO_2$, 3-COOH or 3-$COOCH_3$. Preferred compounds XIII are those in which $R^{38}$ is 4-$CH_3$, 4-OH, 4-Cl, 4-COOH or 4-$COOCH_3$. Compounds such as

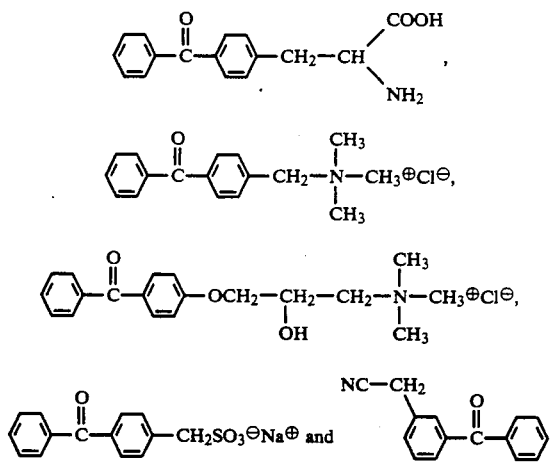

are also suitable.

These compounds are generally known and are obtainable from, for example, Shell Feinchemikalien, D-6236 Eschborn, Riedel de Haen AG, D-3016 Seelze 1, International Bio-Synthetics Ltd., Halebank, Widnes, Cheshire WA8 8NS, UK, or Aldrich Chemie GmbH, D-7924 Steinheim, and others.

Benzophenone is particularly preferably used, mixtures which are liquid at room temperature and consist of benzophenone and suitable assistants having particularly advantageous performance characteristics. Examples of such mixtures are 2,4,6-trimethylbenzophenone/benzophenone in a molar ratio of 1.3:1 to 1:1 or 1-hydroxycyclohexyl phenyl ketone/benzophenone in a molar ratio of 1:1. Mixtures of this type are described in, inter alia, EP-A 209 831.

Component C is advantageously incorporated by stirring it into an aqueous starting dispersion containing one or more synthetic resins A, preferably with heating. In terms of performance characteristics, however, polymerization of monomers d in the synthetic resins A is preferable to incorporation of components C into the novel synthetic resin formulations, since polymerization gives a more homogeneous distribution of the phenone compounds, which is essentially dependent on external influences, for example temperature, and it is essentially retained even during and after film formation by the novel aqueous synthetic resin formulations. The total amount of the monomers d polymerized in the one or more synthetic resins A and of component C is preferably from 0.05 to 5% by weight, based on the one or more synthetic resins A.

Advantageously used components F of the novel synthetic resin formulations are aluminum silicates, quartz, precipitated or pyrogenic silica (which may be rendered hydrophobic), gypsum and barite, talc, dolomite, calcium carbonate, barium sulfate, hornblende or wollastonite. Other suitable components F are color-imparting pigments. Preferably used white pigments are titanium white, lead white, zinc white, lithopone and antimony white, preferably used black pigments are iron oxide black, manganese black, cobalt black, antimony black and carbon black, and preferably used colored pigments are, for example, chrome yellow, red lead, zinc yellow, zinc green, zinc red, cadmium red, cobalt blue, Berlin blue, ultramarine, manganese violet, cadmium yellow, molybdate orange or strontium yellow.

The fillers are usually used in fine particle size. The mean particle size, as the arithmetic mean of the maximum diameter in each case, is preferably from 0.5 to 200 μm. The fillers can, however, also be added in the form of granules having a mean particle size of from 0.1 to 10 mm, for example when the novel formulations are used as renders. However, fibrous materials, such as cellulose fibers, polyacrylonitrile fibers or staple fibers of polyamide, can also be used as finely divided fillers. For the preparation of the novel aqueous synthetic resin formulations, the fillers F are, as a rule, stirred as the final component into synthetic resin dispersions already containing components A to E.

In addition, the novel formulations may contain minor amounts of conventional assistants, such as preservatives, e.g. chloroacetamide or benzothiazolinone, antifoams, for example those based on esters of higher fatty acids, modified silicones or mineral oils, film-forming assistants, e.g. mineral spirit (bp. 180°-200° C.), or esters of glutaric, adipic and succinic acid with isobutanol, thickeners, for example those based on cellulose ethers, such as methylcelluloses, hydroxyethylcelluloses or methylhydroxypropylcelluloses, or those based on polyurethanes, pH-buffering and softening agents, such as the alkali metal salts of polyphosphoric acids, leveling agents, such as polyethylene wax dispersions or diglycol di-n-butyl ether, or pigment disperants such as alkali metal or ammonium salts of polyacrylic acids having a number average molecular weight $\overline{M}_z$ of about $2 \times 10^4$.

The pH of the prepared novel aqueous synthetic resin formulations is preferably from 6 to 12, the agent used for adjusting the pH advantageously being the same basic agent as that used for adjusting the pH of the starting dispersion containing one or more synthetic resins A, preferably ammonia.

On the one hand, the surface tack of the novel aqueous synthetic resin formulations decreases sharply during and after film formation, particularly under the influence of actinic radiation, for example sunlight, in outdoor applications, which reduces the tendency to soiling, and on the other hand said formulations in the solidified state nevertheless simultaneously have high resilience. However, the novel formulations are known to exhibit a sharp decrease in surface tack even in the absence of actinic radiation during film formation.

The fact that the resilience of the films obtainable in the absence of actinic radiation, simply by volatilization of the dispersing medium, further increases under the influence of actinic radiation is also of interest.

Another essential feature of the novel formulations is that their resilience in the solidified state is essentially retained as a function of time under the usual environmental influences, this being particularly true of formulations which contain colored pigments and whose solidified coatings have essentially constant elongations at break. The films also have high water resistance.

The novel formulations are therefore particularly suitable for coating, adhesive bonding, sealing or impregnating substrates of very different materials, such as textile fabrics, fabrics of fiberglass, articles of plastics, such as polyvinyl chloride, polyvinylidene chloride, polystyrene, polyacrylonitrile or cellulose acetate, and of glass, metal, concrete, asbestos cement, stone, sand, steel, leather, wood, ceramic or slate.

We have also found that the novel formulations are particularly suitable as coating materials for walls, floors and ceilings, as marking paints for paths and roads and as renders, said formulations ensuring long-lasting covering of cracks.

EXAMPLES

Below, percentages are by weight.

EXAMPLE 1

Demonstration of High Resilience and Reduced Surface Tack of the Novel Synthetic Resin Formulations A monomer mixture of 70 g of n-butyl acrylate, 24 g of methyl methacrylate, 2 g of diacetoneacrylamide, 2.0 g of acrylonitrile and 2.0 g of acrylic acid was emulsified with 1.5 g of the Na salt of disulfonated dodecylphenyl oxide and 1 g of a mixture of ethoxylated $C_{12}$–$C_{14}$-alkanols (degree of ethoxylation: 20) in 100 g of water.

10% of an aqueous solution of 0.5 g of sodium peroxodisulfate in 10 g of water were then added to 10% of the aqueous emulsion and the mixture was heated to the emulsion polymerization temperature of 85° C. while stirring. Thereafter, while maintaining the polymerization temperature and stirring, the remaining amount of aqueous emulsion was introduced in the course of 2 hours and, simultaneously and continuously, the remaining amount of the aqueous initiator solution in the course of 2.25 hours, via separate feeds. After the end of the initiator feed, polymerization was continued for a further hour.

1 g of benzophenone was stirred into one half (V1) of the resulting, about 50% strength aqueous synthetic resin dispersion and 1 g of benzophenone and 0.75 g of adipic dihydrazide was stirred into the other half (B1). The two synthetic resin formulations were then applied in a width of 8 mm and a length of 100 mm to a glass sheet to give a layer which was 0.5 mm thick when dry, and drying was carried out for 24 hours (under standard conditions of temperature and humidity). The surface tack was then checked by touching with the hand and was evaluated according to DIN 53,230 (0= best possible value, 5= worst possible value). The results are shown in Table 1.

The films formed were then removed from the glass plate and the modulus of elasticity (E' [N/mm$^2$]) was determined according to A. Zosel, Research on the Properties of cured films of aqueous dispersions of polymers" in Double Liaison-Chimie des Peintures—No. 384, October 1987, at −30° and 50° C. The results are likewise shown in Table 1. Film formation was then repeated and the films formed were then passed under a medium pressure mercury lamp (120 W/cm) at a speed of 1 m/min and at a distance of 15 cm, and the surface tack and modulus of elasticity were then determined in the manner described. The results are shown in Table 1.

TABLE 1

|  |  | E' (N/mm$^2$) | | Surface tack (evaluated according to DIN 53,230) |
|---|---|---|---|---|
|  |  | −30° C. | 50° C. |  |
| Without UV exposure | B1 | 1945 | 1.45 | 3.0 |
|  | V1 | 1960 | 0.40 | 5 |
| With UV exposure | B1 | 2320 | 1.85 | 1 |
|  | V1 | 2010 | 0.46 | 4 |

EXAMPLE 2

Investigation of Novel Coating formulations and Renders and Comparative Examples Starting Dispersions (their Synthetic Resin Content was about 50% by Weight in all cases)

D1: A mixture of 200 g of water, 15 g of feed 1, 10 g of feed 2 and 5 g of feed 3 was heated to the polymerization temperature of 45° C. and then, while maintaining the polymerization temperature and stirring, the remaining amount of feed 1 was introduced in the course of 2 hours and, simultaneously and continuously, the remaining amounts of feeds 2 and 3 were added in the course of 2.25 hours, via feeds at different points. After the end of the addition, polymerization was continued for a further hour, after which 2.5 g of benzophenone was stirred in while heating at 60° C., the mixture was cooled to room temperature and 10 g of adipic dihydrazide were then stirred in.

Feed 1

Aqueous emulsion of 250 g of n-butyl acrylate, 160 g of 2-ethylhexyl acrylate, 20 g of diacetoneacrylamide, 70 g of styrene, 15 g of acrylic acid, 6.25 g of acrylamide (as a 50% strength aqueous solution), 7.5 g of emulsifier I, which is a mixture of sodium dodecylsulfate and sodium tetradecylsulfate (as a 20% strength aqueous solution), 6.2 g of emulsifier II, which is a mixture of ethoxylated $C_{12}$–$C_{14}$-alkanols having a degree of ethoxylation of 22 (as a 20% strength aqueous solution) and 137 g of water.

Feed 2

Solution of 3.6 g of tert-butyl hydroperoxide in 100 g of water

Feed 3

Solution of 1.5 g of the Na salt of hydroxymethanesulfinic acid in 40 g of water VD1: As for D1, but without benzophenone D2: As for D1, but without the use of a feed 3; the polymerization temperature was 85° C., no benzophenone was added and feeds 1 and 2 had the following compositions:

Feed 1

Aqueous emulsion of 225 g of n-butyl acrylate, 170 g of 2-ethylhexyl acrylate, 20 g of diacetoneacrylamide, 85 g of styrene, 15 g of acrylic acid, 6.25 g of acrylamide (as a 50% strength aqueous solution), 2.5 g of α, β-acryloylbutene-(4,4'-benzoylphenyl) carbonate, 6.25 g of emulsifier III, which is ethoxylated tertoctylphenol having a degree of ethoxylation of 25 (as a 20% strength aqueous solution) and 199 g of water.

Feed 2

Solution of 2.5 g of sodium peroxodisulfate in 100 g of water

D3: As for D1, but without the use of a feed 3. 5 g of benzophenone were incorporated, the polymerization temperature was 85° C. and feeds 1 and 2 had the following compositions:

Feed 1

Aqueous emulsion of 225 g of n-butyl acrylate, 170 g of 2-ethylhexyl acrylate, 25 g of methacrolein, 80 g of styrene, 6.25 g of acrylamide (as a 50% strength aqueous solution), 15 g of acrylic acid, 10 g of tetrahydrofurfur-2-yl acrylate, 7.5 g of emulsifier I, 6.2 g of emulsifier II and 186 g of water.

Feed 2

As for D2

VD2: As for D3, but without benzophenone.

D4: As for D3, except that feed 1 has the following composition:

Feed 1

Aqueous emulsion of 405 g of 2-ethylhexyl acrylate, 20 g of diacetoneacrylamide, 58 g of methyl methacrylate, 20 g of styrene, 3 g of acrylic acid, 7.5 g of emulsifier I, 6.2 g of emulsifier II and 161 g of water.

D5: As for D1, except that a mixture of 200 g of water, 30 g of feed 1 and 5 g of feed 3 were initially taken and polymerized at 85° C., the remaining feed 1 was added in the course of 1.25 hours, feed 2 in the course of 0.45 hour and the remaining feed 3 in the course of 2.25 hours, and 5 g of benzophenone and 1 g of adipic dihydrazide were stirred in. The feeds had the following compositions:

Feed 1

Emulsion of 222.5 g of n-butyl acrylate, 10 g of methacrolein, 10 g of diacetoneacrylamide, 10 g of acrylic acid, 50 g of methyl methacrylate, 0.8 g of emulsifier I (as a 40% strength aqueous solution), 4 g of emulsifier III (as a 20% strength aqueous solution), 0.8 g of emulsifier IV, which is the Na salt of sulfated ethoxylated tert-octylphenol having a degree of ethoxylation of 25 (as a 35% strength aqueous solution) and 108 g of water.

Feed 2

78.7 g of n-butyl acrylate, 63.2 g of methyl methacrylate, 50.0 g of styrene, 25.6 g of 1-(methacryloxyethyl)-imidazolidin-2-one as a 39% strength solution in methyl methacrylate, 0.4 g of emulsifier I (as a 40% strength aqueous solution), 2.2 g of emulsifier III (as a 20% strength aqueous solution), 0.4 g of emulsifier IV (as a 35% strength aqueous solution), 15 g of butene-1,4-diol, 25 g of a 5% strength aqueous solution of a hydroxyethylcellulose and 76 g of water.

Feed 3

As for feed 2 in D2

D6: As for D1 but without the use of a feed 3. The polymerization temperature was 85° C., 5 g of benzophenone, 2 g of adipic dihydrazide and in addition 15 g of 25% strength aqueous ammonia solution were stirred in and feeds 1 and 2 had the following compositions:

Feed 1

Emulsion of 230 g of styrene, 10 g of diacetonemethacrylamide, 210 g of n-butyl acrylate, 50 g of 2-ethylhexyl acrylate, 9 g of acrylic acid, 6 g of acrylamide (as a 50% strength aqueous solution), 7.5 g of emulsifier IV (as a 20% strength aqueous solution), 7.5 g of emulsifier III (as a 20% strength aqueous solution) and 166 g of water.

Feed 2

As for D2

VD3: As for D6, but without benzophenone b) Surface Tack and Time-Dependent Behavior of the Elongation at Break of Masonry Paints Masonry paints having the following general composition were prepared using starting dispersions D1 to D3 and VD1 and VD2:

130 g of starting dispersion,
0.15 g of tetrasodium pyrophosphate (as a 25% strength aqueous solution),
0.6 g of chloroacetamide,
0.4 g of 25% strength aqueous ammonia solution,
0.8 g of a silicone-based antifoam,
7 g of water,
0.4 g of the ammonium salt of a polyacrylic acid having $\overline{M}_z = 2 \cdot 10^4$,
7 g of titanium white (mean particle size 1 μm),
8 g of talc (mean particle size 5 μm),
40 g of calcium carbonate (mean particle size 5 μm),
1 g of silica (mean particle size 1 μm),
2 g of mineral spirit (bp. 180° C.) and
1.6 g of a mixture of esters of adipic, glutaric and succinic acid with isopropanol.

300 g/m² of each of the masonry paints were then first applied to a fiber cement panel and dried for 6 hours under standard conditions of temperature and humidity. Coating was then repeated using the same amount, drying was carried out for 24 hours under standard conditions of temperature and humidity and the surface tack of the coatings was then checked by touching with the hand and was evaluated according to DIN 53,230.

The coated fiber cement panels were then exposed to sunlight for 1 week facing south at an angle of inclination of 45° and the surface tack test was repeated. The results are shown in Table 2. Furthermore, films were produced from the masonry paints containing starting dispersions D1 to D3 by continuous drying for 24 hours under standard conditions of temperature and humidity and the elongation at break (%) of these films was determined according to DIN 53,455 at −10° C. This test was repeated with films which had furthermore been exposed to outdoor weather for 3 weeks. The results are likewise shown in Table 2.

TABLE 2

|  | Starting dispersions | | | | |
| --- | --- | --- | --- | --- | --- |
|  | D1 | VD1 | D2 | D3 | VD2 |
| Surface tack after 24 h | 1 | 2 | 1 | 1 | 2 |
| Surface tack after exposure to sun for 1 week | 0 | 2 | 0.5 | 0 | 2 |
| Elongation at break (−10° C.) after 24 h [%] | 65 |  | 79 | 69 |  |
| Elongation at break (−10° C.) after outdoor weather for 3 weeks [%] | 62 |  | 73 | 64 |  | c) Time-Dependent Behavior of the Elongation at Break of a Coating on a Flat Roof The following formulation for coating a flat roof was prepared using starting dispersion D4:
- 55.5 g of D4,
- 3.5 g of titanium white (mean particle size 1 μm),
- 27.7 g of calcium carbonate (mean particle size 5 μm),
- 10.4 g of barium sulfate (mean particle size 1 μm),
- 1.5 g of a 5% strength polyurethane thickener solution and
- 1.4 g of an antifoam based on a stearic ester.

The film was formed from the formulation as described under b) and the elongation at break of the film was determined. The results are shown in Table 3.

TABLE 3

| | |
| --- | --- |
| Elongation at break (−10° C.) after 24 h [%] | 179 |
| Elongation at break (−10° C.) after outdoor weathering for 3 weeks [%] | 164 | d) Time-Dependent Behavior of the Elongation at Break of a White House Paint for Wood The following house paint for wood was prepared using starting dispersion D5:
- 563 g of D5,
- 72 g of water,
- 1.5 g of tetrasodium pyrophosphate (as a 10% strength aqueous solution),
- 1.2 g of the ammonium salt of a polyacrylic acid having $\overline{M}_z = 2.10^4$,
- 5 g of mineral spirit (bp. 180° C.),
- 2 g of chloroacetamide,
- 1 g of a 5% strength aqueous solution of hydroxyethylcellulose,
- 7 g of a silicone-based antifoam,
- 24 g of talc (mean particle size 5 μm),
- 116 g of calcium carbonate (mean particle size 5 μm),
- 173 g of titanium white (mean particle size 1 μm),
- 0.7 g of a 25% strength aqueous ammonia solution,
- 6.7 g of a 35% strength polyurethane thickener solution and
- 13.4 g of diglycol di-n-butyl ether.

The film was formed from the formulation as described under b) and the elongation at break of the film was determined. The results are shown in Table 4.

TABLE 4

| | |
| --- | --- |
| Elongation at break (−10° C.) after 24 h [%] | 99 |
| Elongation at break (−10° C.) after outdoor weathering for 3 weeks [%] | 94 | e) Surface Tack of Plasters

The following formulation was prepared as a plaster, using starting dispersions D6 and VD3:
- 170 g of starting dispersion,
- 21 g of a 3% strength aqueous solution of methylhydroxypropylcellulose,
- 2.5 g of tetrapotassium pyrophosphate (as a 50% strength aqueous solution),
- 3 g of polyethylene wax dispersion,
- 4 g of an antifoam based on mineral oil,
- 2 g of benzothiazolinone,
- 20 g of mineral spirit (bp. 180° C.),
- 20 g of a mixture of esters of adipic, glutaric and succinic acid with isopropanol,
- 32 g of titanium white (mean particle size 1 μm),
- 267 g of calcium carbonate (mean particle size 40 μm),
- 77 g of calcium carbonate (mean particle size 130 μm),
- 79 g of aluminum silicate (mean particle size 5 μm) and
- 300 g of calcium carbonate granules (mean particle size 3 μm).

The plaster was then applied to a fiber cement panel and dried as described in b), and the surface tack was determined. The results are shown in Table 5.

TABLE 5

|  | Starting dispersion | |
| --- | --- | --- |
|  | D6 | VD3 |
| Surface tack after exposure to sun for 1 week | 1 | 3 |

We claim:

1. An aqueous synthetic resin formulation containing
A) from 3 to 75% by weight of one or more synthetic resins which consists of
 a) from 50 to 99.85% by weight of one or more esters of α, β-monoethylenically unsaturated carboxylic acids of 3 to 6 carbon atoms and alkanols of 1 to 18 carbon atoms or one or more vinyl esters of an aliphatic monocarboxylic acid of 2 to 8 carbon atoms or of a mixture of these monomers (monomer a),
 b) from 0.1 to 12% by weight of one or more α, β-monoethylenically unsaturated mono- or dibasic acids of 3 to 8 carbon atoms, of anhydrides thereof or of a mixture of these monomers (monomer b),
 c) from 0.05 to 10% by weight of one or more monoethylenically unsaturated monomers of 2 to 24 carbon atoms which are not an acetophenone or benzophenone derivative and have one or more aldehyde or keto groups or a mixture of both groups (monomer c),
 d) from 0 to 10% by weight of one or more monoethylenically unsaturated acetophenone or benzophenone derivatives or a mixture of these monomers (monomer d) and
 e) from 0 to 35% by weight of one or more copolymerizable monoethylenically unsaturated monomers other than monomers (a)-(d) (monomer e), in polymerized form, the percentages by weight of monomers a, b, c and e being chosen within the stated limits so that a synthetic resin consisting only of these monomers would have a glass transition temperature of from 40° to −50° C., B) one or more organic compounds having two or more hydrazide groups, C) from 0 to 10% by weight, based on the synthetic resin A, of benzophenone or acetophenone or of one or more acetophenone or benzophenone derivatives which are not monoethylenically unsaturated or of a mixture of these active ingredients, D) effective amounts of emulsifiers or protective colloids or of a mixture of these active ingredients, E) not less than 5% by weight of water and F) from 0 to 85% by weight of finely divided fillers, with the proviso that the total amount of the monomers d polymerized in the one or more synthetic resins A and of component C is from 0.05 to 10% by weight, based on the one or more synthetic resins A, and the ratio of the number of moles of hydrazide groups of component B and the number of moles of the aldehyde and keto groups of the monomers c polymerized in the one or more synthetic resins A is from 0.01 to 2.

2. A synthetic resin formulation as claimed in claim 1, whose synthetic resins A contain, as polymerized monomers, α, β-monoethylenically unsaturated mono- or dicarboxylic acids, anhydrides thereof or mixtures of these monomers.

3. A synthetic resin formulation as claimed in claim 1, whose synthetic resins A contain, as polymerized monomers c, one or both of the monomers diacetoneacrylamide and diacetonemethacrylamide.

4. A synthetic resin formulation as claimed in claim 1, whose synthetic resins A contain, as polymerized monomers d, one or more of the compounds

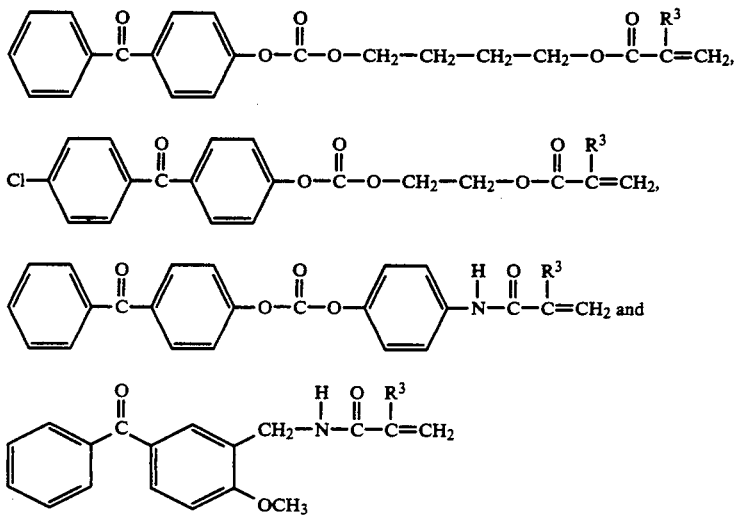

where $R^3$ is —H or —$CH_3$.

5. A synthetic resin formulation as claimed in claim 1, whose synthetic resins A contain the monomers a, b, c and e polymerized in amounts such that a synthetic resin consisting only of the monomers a, b, c and e would have a glass transition temperature of −30° to −10° C.

6. A synthetic resin formulation as claimed in claim 1, which contains adipic dihydrazide as the organic compound having two or more hydrazide groups.

7. A synthetic resin formulation as claimed in claim 1, which contains benzophenone as component C.

8. A synthetic resin formulation as claimed in claim 1, which contains, as component D, a compound of the formula XII

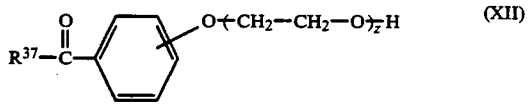 (XII)

where Z is from 1 to 200 and $R^{37}$ is —$CH_3$ or —$C_6H_5$ which is substituted by straight-chain or branched alkyl of 1 to 18 carbon atoms.

* * * * *